United States Patent
Cho et al.

(10) Patent No.: US 10,850,592 B2
(45) Date of Patent: Dec. 1, 2020

(54) ENGINE CONTROL METHOD FOR HEATING OF HYBRID ELECTRIC VEHICLE

(71) Applicants: HYUNDAI MOTOR COMPANY, Seoul (KR); KIA MOTORS CORPORATION, Seoul (KR)

(72) Inventors: In Eok Cho, Incheon (KR); Jung Soo Park, Seoul (KR); Jang Hyo Lee, Hwaseong-si (KR); Yong Hoon Lee, Incheon (KR); Chun Hyuk Lee, Suwon-si (KR); Il Kwon Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 98 days.

(21) Appl. No.: 16/216,792

(22) Filed: Dec. 11, 2018

(65) Prior Publication Data

US 2019/0193516 A1    Jun. 27, 2019

(30) Foreign Application Priority Data

Dec. 27, 2017   (KR) .......................... 10-2017-0181117

(51) Int. Cl.
*B60H 1/00*         (2006.01)
*B60W 10/30*      (2006.01)
(Continued)

(52) U.S. Cl.
CPC ......... *B60H 1/00885* (2013.01); *B60H 1/004* (2013.01); *B60H 1/00735* (2013.01);
(Continued)

(58) Field of Classification Search
CPC ................ B60H 1/004; B60H 1/00735; B60H 1/00885; B60H 1/02; B60W 10/06; B60W 10/30; B60W 20/16; B60W 20/20
See application file for complete search history.

(56) References Cited

U.S. PATENT DOCUMENTS 5,452,587 A * 9/1995 Honda ............... B60H 1/00735
                                                                165/209
5,934,089 A * 8/1999 Nakagawa ............. B60H 1/004
                                                                 62/133

(Continued)

FOREIGN PATENT DOCUMENTS

JP     2005-337173 A    12/2005
JP     2012-81871 A      4/2012
JP     2016-13800 A      1/2016

*Primary Examiner* — Carl C Staubach
(74) *Attorney, Agent, or Firm* — McDonnell Boehnen Hulbert & Berghoff LLP

(57) ABSTRACT

An engine control method for heating of a hybrid electric vehicle, includes collecting information for air conditioning control by a sensor during an operation of a heating, ventilation, and air conditioning (HVAC) device in the hybrid electric vehicle in which forced engine driving for heating is performed, determining whether a condition that requires pre-engine driving as driving in a separate mode from forced engine driving is satisfied based on the collected information, upon determining that the condition that requires the pre-engine driving is required is satisfied, determining whether a condition for allowing the pre-engine driving is satisfied based on engine efficiency and hybrid system efficiency information, and upon determining that the condition for allowing the pre-engine driving is satisfied, performing the pre-engine driving for driving an engine to manage engine coolant temperature.

7 Claims, 5 Drawing Sheets

(51) Int. Cl.
*B60W 20/20* (2016.01)
*B60W 20/16* (2016.01)
*B60H 1/02* (2006.01)
*B60W 10/06* (2006.01)

(52) U.S. Cl.
CPC .............. *B60H 1/02* (2013.01); *B60W 10/06* (2013.01); *B60W 10/30* (2013.01); *B60W 20/16* (2016.01); *B60W 20/20* (2013.01)

(56) References Cited

U.S. PATENT DOCUMENTS

| | | | |
|---|---|---|---|
| 2007/0220883 A1* | 9/2007 | Harada | B60W 10/06 60/597 |
| 2014/0110489 A1* | 4/2014 | Yasui | B60N 2/0244 237/5 |
| 2015/0246591 A1* | 9/2015 | Ono | B60W 10/30 701/22 |
| 2017/0190235 A1* | 7/2017 | Yoo | B60W 20/10 |
| 2017/0341487 A1* | 11/2017 | Lee | F01P 3/20 |
| 2019/0031175 A1* | 1/2019 | Lee | B60W 10/08 |

\* cited by examiner

ENGINE CONTROL METHOD FOR HEATING OF HYBRID ELECTRIC VEHICLE

CROSS-REFERENCE TO RELATED APPLICATION

This application claims under 35 U.S.C. § 119(a) the benefit of priority to Korean Patent Application No. 10-2017-0181117 filed on Dec. 27, 2017, the entire contents of which are incorporated herein by reference.

BACKGROUND (a) Technical Field

The present disclosure relates to an engine control method for heating of a hybrid electric vehicle.

(b) Background Art

A vehicle includes a heating, ventilation, and air conditioning (HVAC) device installed therein for adjusting indoor temperature and promoting a pleasant indoor environment.

Recently, a full automatic temperature control (FATC) system for automatically adjusting indoor temperature to maintain a pleasant environment depending on temperature set by a driver or a passenger has been applied to most vehicles.

A hybrid electric vehicle is driven using an engine and a motor as a driving source and uses both fossil fuel energy and electric energy for vehicle driving. Thus, the hybrid electric vehicle is an eco-friendly vehicle for reducing exhaust gas and enhancing fuel efficiency.

A general hybrid electric vehicle selects a driving mode depending on a driving condition and, in this regard, travels in an electric vehicle (EV) mode using only motor power or in a hybrid electric vehicle (HEV) mode using both engine power and motor power.

During vehicle braking or coasting based on inertia, a regenerative mode in which kinetic energy of a vehicle is recovered as electric energy via power generation of a motor to recharge a battery is executed.

Such a hybrid electric vehicle is capable of traveling in an EV mode using a motor without operation of the internal combustion engine during vehicle driving at low speed or low torque.

In a vehicle driving condition based on engine driving, as in an HEV mode, it is possible to drive the engine with a high-efficiency operating point and to drive a whole hybrid system at optimum efficiency via optimum torque distribution of the engine and the motor. Thus, the hybrid electric vehicle has higher fuel efficiency than a general internal combustion engine vehicle.

SUMMARY OF THE DISCLOSURE

One aspect of the present disclosure provides an engine control method for heating of a hybrid electric vehicle to minimize fuel efficiency decrease during the winter season that may be caused due to forced engine driving for indoor heating when the vehicle is stationary or in slowdown or coasting in which a regenerative mode is executed.

In an embodiment, an engine control method for heating of a hybrid electric vehicle includes detecting information for air conditioning control by a sensor during an operation of a heating, ventilation, and air conditioning (HVAC) device in the hybrid electric vehicle in which forced engine driving for heating is performed, determining, by a controller, whether a condition that requires pre-engine driving as driving in a separate mode from forced engine driving is satisfied based on the detected information, upon determining that the condition that requires the pre-engine driving is required is satisfied, determining, by the controller, whether a condition for allowing the pre-engine driving is satisfied based on engine efficiency and hybrid system efficiency information, and upon determining that the condition for allowing the pre-engine driving is satisfied, performing, by the controller, the pre-engine driving for driving an engine to manage engine coolant temperature.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

DETAILED DESCRIPTION

Figure 1:
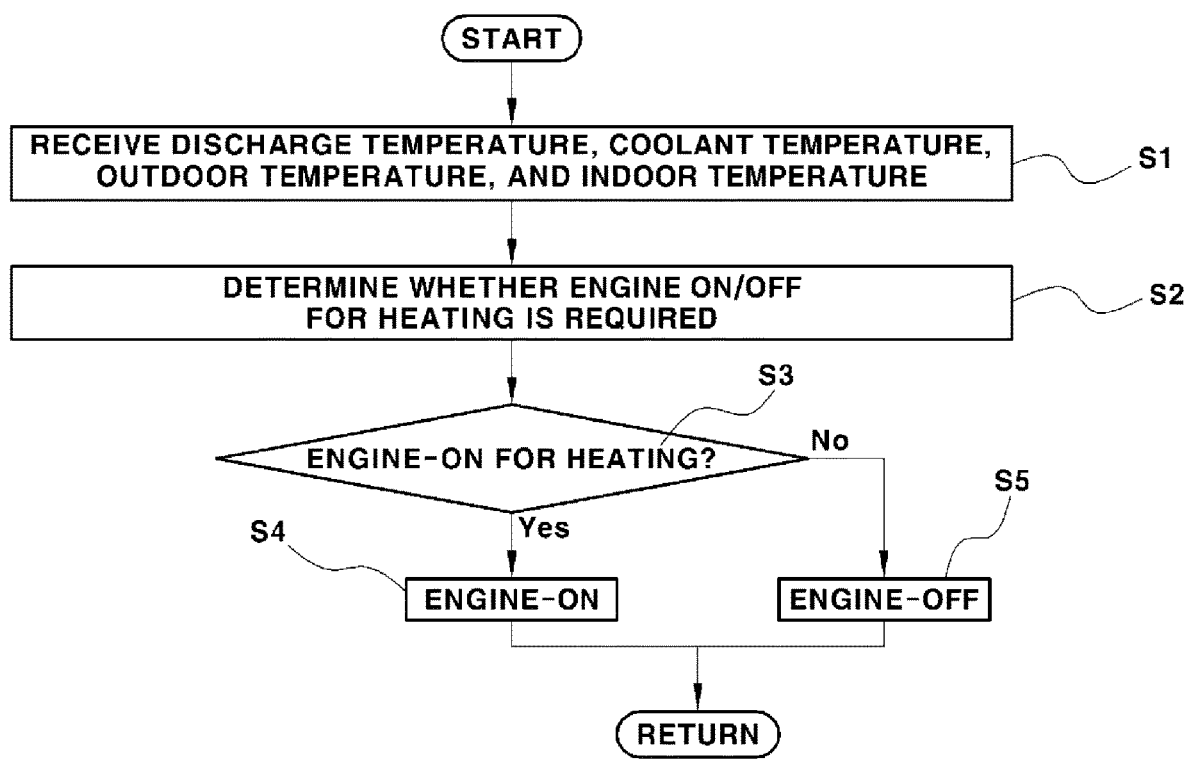
FIG. 1 is a flowchart of a typical engine control method for heating.

Hereinafter reference will be made in detail to various embodiments of the present disclosure, examples of which are illustrated in the accompanying drawings and described below.

Embodiments of the present disclosure are described in detail so as for those of ordinary skill in the art to easily implement with reference to the accompanying drawings. However, the present disclosure may be implemented in various different forms and is not limited to these embodiments.

Throughout this specification, unless explicitly described to the contrary, the word "comprise" and variations such as "comprises" or "comprising", will be understood to imply the inclusion of stated elements but not the exclusion of any other elements.

A heat source for heating a passenger room during the winter season in a vehicle may be an engine. Engine coolant heated by the engine may be used for heating, and the engine coolant may exchange heat with air for air conditioning (indoor air and outdoor air) while being transmitted through a heater core.

While being transmitted around the heater core, the air for air conditioning may be heated via heat exchange with the engine coolant in the heater core and the heated air for air conditioning may be discharged into the vehicle, e.g., a passenger compartment, to perform indoor heating.

A FATC system is configured in such a way that an air conditioning controller (FATC controller) receives a detection signal from sensors including a solar radiation quantity sensor for detection of a solar radiation quantity, an outdoor temperature sensor for detection of outdoor temperature, and an indoor temperature sensor for detection of vehicle indoor temperature to control indoor temperature when a user sets temperature.

The air conditioning controller calculates an indoor thermal load based on a detection value of each sensor and determines a discharge mode, discharge temperature, a discharge direction, a discharge air volume, and the like in consideration of an air conditioning load corresponding to the calculated indoor thermal load.

In addition, the air conditioning controller may further receive a detection value from a discharge temperature sensor for detection of discharge temperature that is the temperature of discharged air (i.e., air temperature at a discharge port), a water temperature sensor for detection of engine coolant temperature, an evaporator temperature sensor for detection of evaporator temperature, and so on to control indoor temperature and a system operation.

The air conditioning controller controls operating components such as a mode actuator, a temperature door (temperature adjusting door) actuator, an air volume adjusting door actuator, an air conditioning blower, and a compressor to control air supply for air conditioning with the determined discharge mode, discharge temperature, discharge direction, and discharge air volume.

A hybrid electric vehicle of an eco-friendly vehicle includes an engine installed therein, and thus, it may be possible to perform indoor heating using heat of the engine, as described above.

When a hybrid vehicle travels in a low temperature condition during the winter season, the engine needs to be driven and maintained in an idle state to ensure heating performance even in an EV driving state or a stationary state or during braking or coasting in which an engine is stopped to enhance fuel efficiency, and thus, fuel efficiency may be degraded compared with a general driving condition.

The top cause of degradation of fuel efficiency when a vehicle travels during the winter season is loss due to engine idle driving to respond to a heating load.

FIG. 1 is a flowchart of a typical engine control method for heating. A controller may receive environment information, such as discharge temperature, coolant temperature, outdoor temperature, and indoor temperature, which are detected by a sensor (S1) and determine whether engine on/off for heating is required based on the received information (S2).

Then, when a condition that requires engine-on for heating is satisfied, the engine may be turned on (S3 and S4). And, when a condition that does not require engine-on for heating is satisfied, the engine may be maintained in an off-state (S3 and S5).

Figure 2:
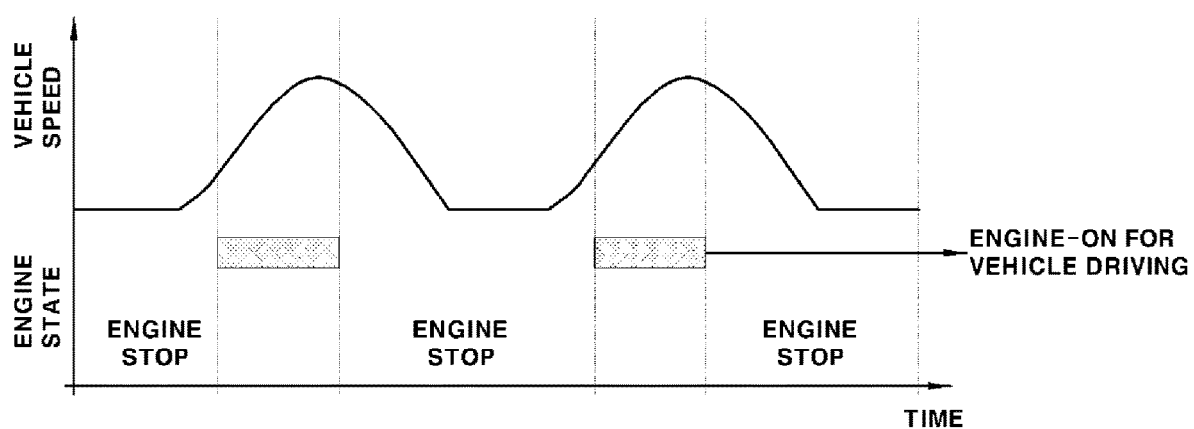
FIGS. 2 and 3 are diagrams showing the state in which an engine of a hybrid electric vehicle is controlled.
Figure 3:
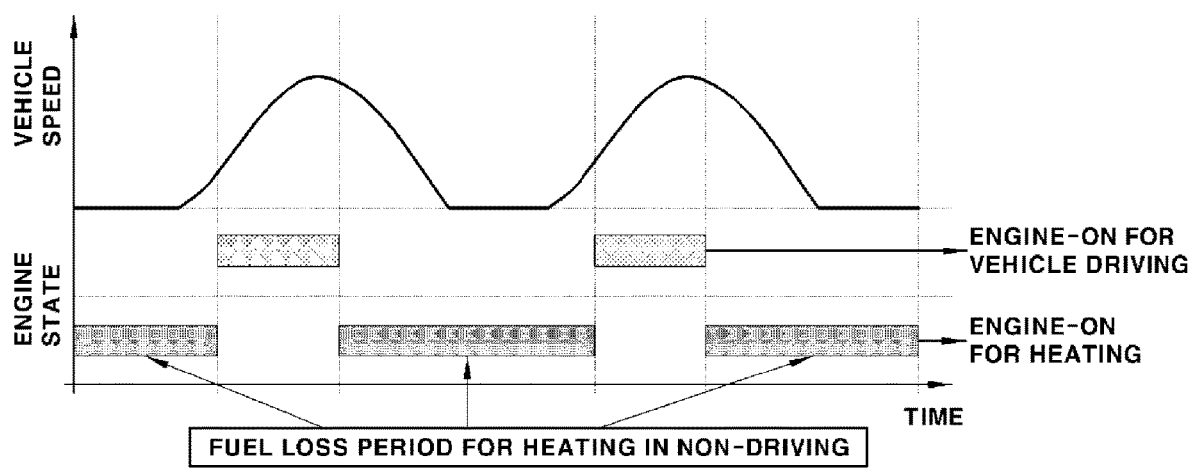

FIGS. 2 and 3 are diagrams showing the state in which an engine of a hybrid electric vehicle is controlled. FIG. 2 illustrates an engine control state in a condition in which heating is not required. FIG. 3 illustrates an engine control state in a condition in which heating is required during the winter season.

Since a hybrid electric vehicle includes an engine installed therein to be used as a heat source during heating, a high-temperature engine coolant is transmitted through a heater core and cold air (indoor air or outdoor air) is transmitted through the heater core in which the engine coolant flows, and thus, the heater core may supply the air heated via heat exchange with the engine coolant into the vehicle to perform heating.

In this case, to control indoor temperature (e.g., the temperature of the passenger compartment or passenger room), a temperature door (Temp. door) may be used and a position and opening degree (an opening degree at the heater core) of the temperature door may be controlled to adjust discharge temperature.

As shown in FIG. 2, when heating is not required and, simultaneously, engine driving is not required like in EV driving or in a stationary state, the engine may be stopped (engine off).

However, when heating is required during the winter season, the engine needs to be driven in an idle state (engine on) for heating even in a condition in which engine driving is not required, as shown in FIG. 3.

Comparing FIGS. 2 and 3, a time period in which an engine is turned on in a condition in which heating is required is greater than a time period in which the engine is turned on in a condition in which heating is not required and fuel loss is high in a non-driving condition (i.e., a condition in which an engine is not used to drive a vehicle or a condition in which the engine is used only for heating) due to a period in which an engine is turned on for simple heating, thereby degrading fuel efficiency during the winter season.

In embodiments, in a hybrid electric vehicle, when engine coolant temperature (coolant temperature) or discharge-port air temperature (discharge temperature) of a heating, ventilation, and air conditioning (HVAC) device is lower than temperature required for heating, an air conditioning controller (full automatic temperature control (FATC) controller) may request forced engine driving and an engine control unit (ECU) may forcibly drive the engine in response to the request of the air conditioning controller.

In embodiments, the engine coolant temperature may be detected by a water temperature sensor and the discharge-port air temperature may be the temperature of air discharged through a discharge port of a vehicle vent and detected by a discharge temperature sensor and, hereinafter, the engine coolant temperature is referred to as coolant temperature and discharge-port air temperature is referred to as discharge temperature.

To satisfy drivers' demand for heating in a vehicle, coolant temperature equal to or greater than a predetermined value needs to be maintained. To this end, when an engine is driven (an engine is forcibly driven for heating), a number of times that the vehicle is stationary and is slowed down and the engine is stopped during coasting for enhancing fuel efficiency of a hybrid electric vehicle may be reduced, thereby lowering fuel efficiency.

In embodiments, the engine is forcibly driven only for heating but not for vehicle driving. Thus, fuel loss may be generated by the engine and fuel efficiency of a vehicle may be degraded due to fuel loss for heating.

Accordingly, the present disclosure may provide an engine control method for heating of a hybrid electric vehicle to minimize degraded fuel efficiency during the winter season due to forced engine driving for heating when the vehicle is stationary, or in slowdown or coasting in which a regenerative mode is executed.

One aspect of the present disclosure introduces a pre-engine driving concept of pre-driving an engine in a predetermined condition to maintain and manage engine coolant temperature (coolant temperature) to be equal to or greater than a predetermined level prior to request for forced engine driving for heating.

In embodiments, the pre-engine driving refers to engine driving for indoor heating in a vehicle, and particularly, refers to the case in which an engine is pre-driven to maintain and manage coolant temperature (engine coolant temperature) to be equal to or greater than a predetermined level, when a predetermined condition is satisfied even prior to a request for forced engine driving.

In embodiments, ultimately, the pre-engine driving for maintaining an engine coolant in temperature equal to or greater than a predetermined level is also used for indoor heating in a vehicle, and consequently, engine driving for heating according to the present disclosure may be classified into typical forced engine driving for elevating coolant temperature when coolant temperature does not satisfy a heating condition and pre-engine driving that is mainly used to maintain and manage the engine coolant to be equal to or greater than a predetermined level.

According to embodiments of the present disclosure, a condition in which pre-engine driving is performed may be discriminately set from the typical forced engine driving condition for heating and, accordingly, the pre-engine driving may be independently performed from the typical forced engine driving.

In embodiments, the condition in which the pre-engine driving is performed and the condition in which the forced engine driving for heating is performed may be simultaneously satisfied and, in this case, compared with each of the pre-engine driving for heating and the typical forced engine driving, engine driving when the conditions are simultaneously satisfied may not be different in that the engine is driven and controlled via cooperative control between controllers in a vehicle.

Hereinafter, the term "engine-on" refers to the case in which combustion is performed when fuel is supplied and injected to drive an engine and the term "engine-off" refers to the case in which combustion is not performed and an engine is not driven due to fuel cut.

In addition, the condition of the typical forced engine driving for heating may be a condition in which coolant temperature or discharge temperature is lower than a corresponding one of predetermined temperature required for heating and, upon satisfying the condition in which the coolant temperature or the discharge temperature is lower than a corresponding one of temperature required for heating, forced engine driving for engine-on for heating may be performed.

As described above, the pre-engine driving may be engine driving performed to maintain and manage coolant temperature (engine coolant temperature) to be equal to or greater than a predetermined level in a state in which an engine is stopped during heating while a vehicle travels.

For example, upon satisfying a predetermined pre-engine driving condition when a vehicle travels in an EV mode, the engine may be driven to elevate coolant temperature so as to maintain and manage the coolant temperature to be equal to or greater than a predetermined level.

As such, the pre-engine driving may be engine driving that is performed when a predetermined pre-engine driving condition is satisfied even if a condition in which the engine is maintained in an off-state is satisfied like in an EV mode.

The pre-engine driving may be performed by driving an engine by an engine controller according to a request signal for pre-engine driving when an air conditioning controller determines that the predetermined pre-engine driving condition is satisfied, and then, transmits the request signal for pre-engine driving to the engine controller.

As a result, according to the present disclosure, coolant temperature may be pre-maintained and managed to be equal to or greater than a predetermined level via pre-engine driving. Thus, a frequency of forced engine driving and a forced driving time for heating when the vehicle is stationary or in slowdown or coasting may be reduced.

A time period in which an engine is stopped in a stationary state and a slowdown state (regenerative mode) for enhancing fuel efficiency of a hybrid electric vehicle may be increased, thereby enhancing fuel efficiency of the vehicle during the winter season.

In short, a time period for engine driving may be increased compared with a state in which heating is not required but coolant temperature may be maintained to be equal to or greater than a predetermined level, thereby enhancing fuel efficiency of a vehicle compared with a typical case in which only forced engine driving for heating is performed during the winter season.

According to the present disclosure, pre-engine driving for heating may be pre-performed prior to forced engine driving for heating but the engine may be driven only when engine efficiency and system efficiency are high. In embodiments, the controller may cause the engine to operate in the forced engine driving mode without determining if engine efficiency and system efficiency are greater than pre-set levels while the controller may cause the engine to operate in the pre-engine driving mode when determined that the engine efficiency and system efficiency are greater than the pre-set levels.

Upon determining that engine efficiency and system efficiency are high during pre-engine driving, engine driving may be guided to be continuously performed to maintain coolant temperature.

As such, according to the present disclosure, upon determining that engine efficiency and system efficiency are high, the engine may be driven (pre-engine driving) to maintain the coolant temperature to be equal to or greater than a predetermined level. Thus, a number of times that the engine is driven may be increased compared with a condition in which heating is not required but a time period for engine driving may be reduced compared with the typical case in which heating during the winter season is required, thereby enhancing fuel efficiency of a vehicle.

Hereinafter, the typical forced engine driving for heating will be simply referred to as forced engine driving. To differentiate from the forced engine driving, engine driving performed to maintain and manage the engine coolant temperature to be equal to or greater than a predetermined level when a predetermined condition is satisfied even if the condition is not a condition in which general engine driving is required will be referred to as pre-engine driving. In embodiments, the pre-engine driving does not include engine driving for moving the vehicle.

Accordingly, the forced engine driving and the pre-engine driving will be discriminately understood hereinafter.

Figure 4:
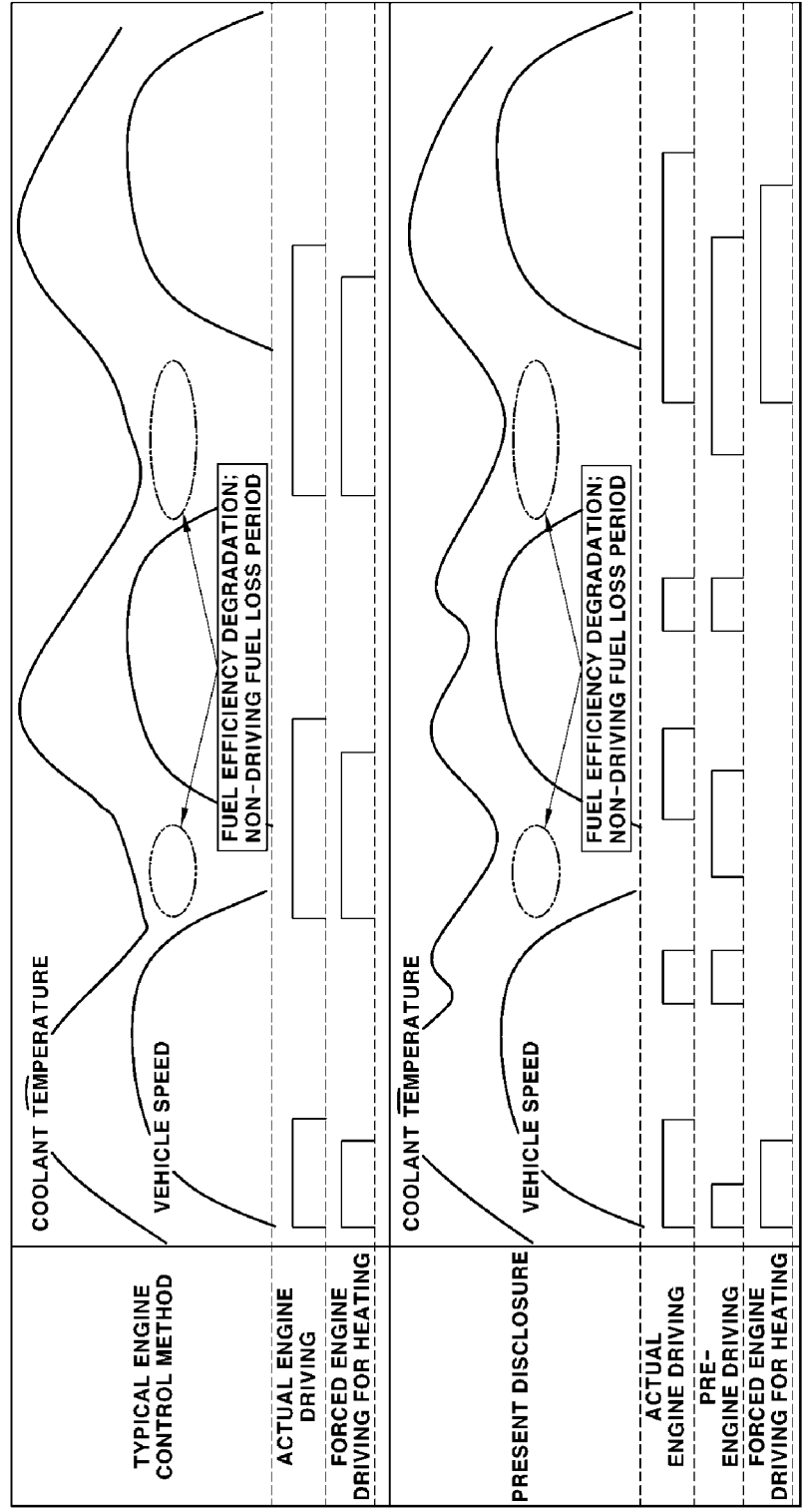
FIG. 4 is a diagram showing comparison of an engine on/off state between a typical control method and a control method according to the present disclosure.

FIG. 4 is a diagram showing comparison of an engine on/off state between a typical control method and a control method according to the present disclosure.

As seen from FIG. 4, in the typical control method, an forced engine driving period for heating overlaps with a period in which an engine is actually driven and, in the control method according to the present disclosure, pre-engine driving is performed in a partial period but forced engine driving is performed in a lower frequency and a shorter time period than in the typical control method.

In particular, compared with the typical control method, in the control method according to the present disclosure, when an engine is driven, a number of times that the engine is driven may be reduced in a period in which fuel efficiency is degraded, e.g., in a slowdown period (regenerative mode) or in a period in which the vehicle is stationary.

In embodiments, compared with the typical case, according to the present disclosure, the engine may be stopped for a long time period during a slowdown state (regenerative mode) or in a vehicle stationary state.

In a general vehicle, outdoor air or indoor air may be used to make warm air via heat exchange with an engine coolant and introduced indoors during heating and, when the engine is stopped, the coolant temperature (engine coolant temperature) may be lowered.

Accordingly, typically, when coolant temperature during heating is lower than temperature required for heating, the engine may be forcibly driven according to a request of the air conditioning controller and, in this case, coolant temperature needs to be maintained to be equal to or greater than a predetermined value for heating. Thus, it may not be possible to stop the engine in a vehicle stationary state or a vehicle slowdown state (regenerative mode), thereby degrading fuel efficiency.

However, according to the present disclosure, upon satisfying a predetermined condition, e.g., a condition in which engine efficiency and system efficiency are high prior to forced engine driving for heating, the engine may be driven (pre-engine driving) to maintain and manage the coolant temperature to be equal to or greater than a predetermined value. Thus, the engine may be stopped for a long time period in a vehicle stationary state and a vehicle slowdown state compared with the typical case, thereby enhancing fuel efficiency of the vehicle during the winter season.

In embodiments, the condition in which forced engine driving is carried out and the condition in which pre-engine driving is carried out are different from each other. For example, there may be differences in engine RPM, fuel consumption, operation time, and idling. In other embodiments, they could be the same in the forced engine driving and the pre-engine driving.

As seen from FIG. 4, according to the present disclosure, a time period for driving an engine in a non-driving fuel loss period, e.g., a vehicle stationary period and a vehicle slowdown (regenerative mode) period may be reduced compared with the typical case, and the coolant temperature may be maintained and manage to a level required for heating. Thus, heating performance of the vehicle may be maintained.

Hereinafter, an engine control method for heating according to the present disclosure will be described with reference to drawings.

Figure 5:
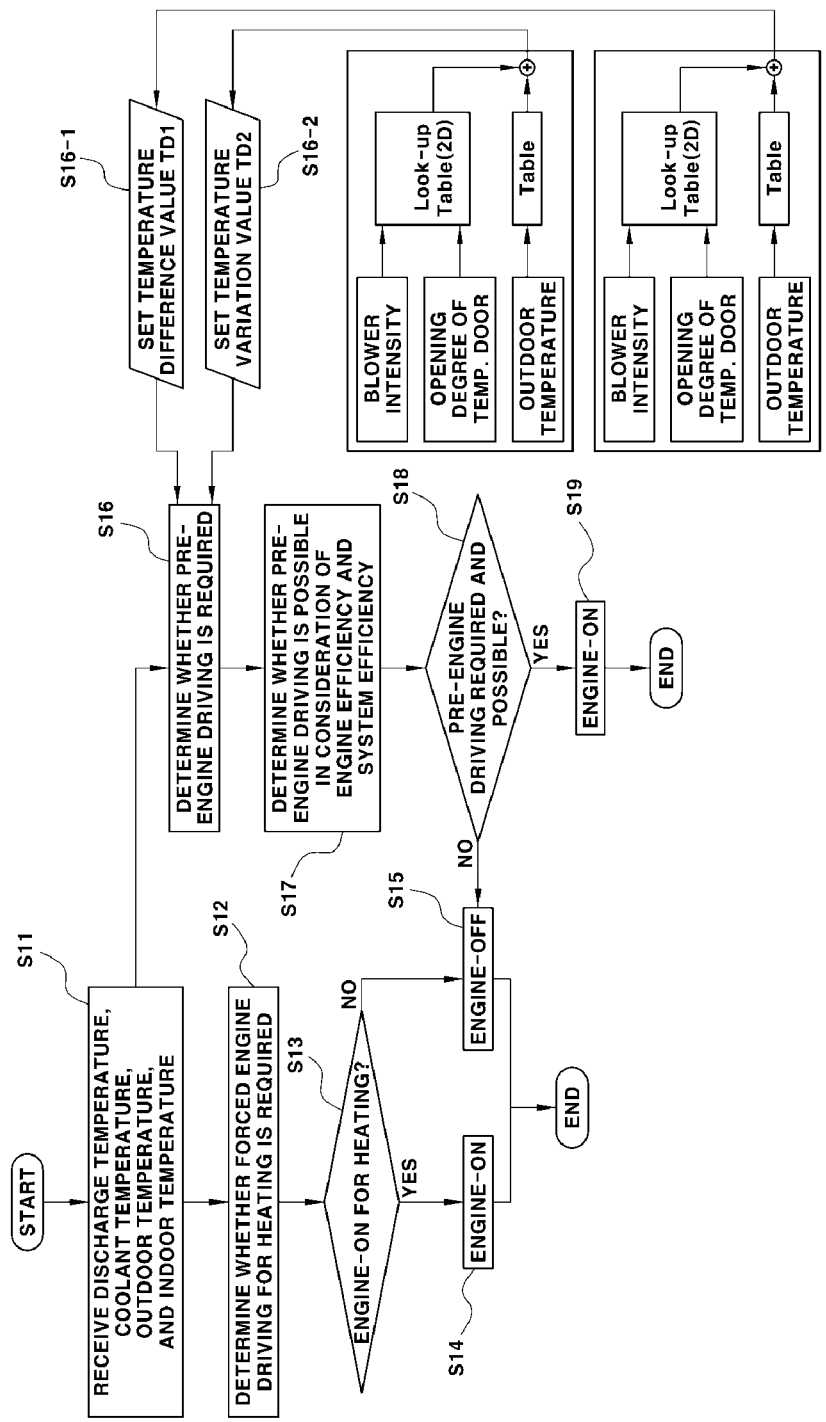
FIG. 5 is a flowchart of an engine control method for heating of a hybrid electric vehicle according to an embodiment of the present disclosure.

FIG. 5 is a flowchart of an engine control method for heating of a hybrid electric vehicle according to an embodiment of the present disclosure.

First, sensors in a vehicle may detect discharge temperature, coolant temperature, outdoor temperature, indoor temperature, and so on, and a controller, e.g., an air conditioning controller (FATC controller) may receive information for control of air conditioning, for example, discharge temperature, coolant temperature, outdoor temperature, and indoor temperature, which are detected by each sensor, in real time (S11).

Then, whether a condition in which indoor heating of a vehicle is required is satisfied may be determined based on the information for control of air conditioning, in particular, environment information such as discharge temperature, coolant temperature, outdoor temperature, and indoor temperature, which are detected by the sensor.

In embodiments, the air conditioning controller may determine whether a predetermined condition in which indoor heating is required is satisfied based on the environment information such as discharge temperature, coolant temperature, outdoor temperature, and indoor temperature, which are detected by the sensor.

Here, upon determining that the predetermined condition in which a heating operation is required is satisfied, the air conditioning controller may operate a HVAC device for heating and control an operation of the HVAC device to maintain the indoor temperature of the vehicle to setting temperature.

A high-temperature engine coolant may be used as a medium of indoor heating. Thus, the engine may be driven as necessary via cooperative control between the air conditioning controller and the engine controller.

In detail, when the HVAC device is operated during the heating operation, that is, for heating, the air conditioning controller may determine whether the engine needs to be driven (engine-on) or to be stopped (engine-off) for heating like in the typical case (S12).

The air conditioning controller may determine whether the engine needs to be forcibly driven based on the environment information detected by the sensor and, for example, may determine that forced engine driving is required when coolant temperature (engine coolant temperature) or discharge temperature (discharge-port air temperature of a vehicle vent) is lower than a temperature required for heating.

As such, upon determining that forced engine driving is required, the air conditioning controller may output and transmit an engine driving request signal and the engine controller may receive the engine driving request signal from the air conditioning controller to drive the engine (S13 and S14).

In a state in which the engine is driven, heat exchange between a high-temperature coolant and air for air conditioning (for heating) (indoor air and outdoor air) may be performed in a heater core while a high-temperature coolant heated by the engine is transmitted through the heater core, and the air heated via heat exchange may be discharged into the vehicle to perform heating.

On the other hand, when the engine is not required to be forcibly driven for heating in operation S13, the engine may be maintained in a stationary state (S15).

The air conditioning controller may determine whether pre-engine driving is required during heating based on the environment information detected by sensors (S16).

For example, settings may be made in such a way that, during indoor heating, the air conditioning controller compares the coolant temperature or the discharge temperature which are detected by the sensor with predetermined pre-engine driving reference temperature Tref and, when a difference between the coolant temperature or discharge temperature detected by the sensor and the pre-engine driving reference temperature reaches a predetermined temperature difference value Td1, pre-engine driving is determined to be required.

The air conditioning controller may determine whether pre-engine driving is performed based on engine efficiency and hybrid system efficiency information. To this end, determine whether a condition in which the engine efficiency and the hybrid system efficiency that are obtained with reference to efficiency data (which may be an efficiency map or the like) are equal to or greater than a corresponding one of predetermined levels is satisfied (S17).

Here, the air conditioning controller may determine that pre-engine driving is required when the difference between the detected coolant temperature or discharge temperature and the pre-engine driving reference temperature reaches a predetermined temperature difference value Td1 and, determine that pre-engine driving is possible when a condition in which the obtained engine efficiency and system efficiency is equal to or greater than a predetermined level is satisfied.

As such, upon determining that pre-engine driving is required and is possible, the air conditioning controller may output a request signal for pre-engine driving and the engine controller may receive the request signal of the air conditioning controller to drive the engine in a predetermine pre-engine driving mode (S18 and S19).

According to the present disclosure, during the aforementioned pre-engine driving for indoor heating, when the coolant temperature or the discharge temperature is elevated to a predetermined temperature variation value Td2 from a time point when the pre-engine driving is started, the air conditioning controller may stop pre-engine driving to stop the engine via cooperative control with the engine controller.

According to an embodiment of the present disclosure, the temperature difference value Td1 and the temperature variation value Td2 may be varied according to heating load information collected from a vehicle and, for example, may be determined by the air conditioning controller based on driving intensity (which may be a driving stage number) that is an operation state of an air conditioning blower, an opening degree of a temperature door (which may correspond to temperature door position information and may be an opening degree at the heater core), and the outdoor temperature detected by the outdoor temperature sensor, as shown in FIG. 5 (S16-1 and S16-2).

In embodiments, the air conditioning controller may determine the temperature difference value Td1 and the temperature variation value Td2, corresponding to current driving intensity of the air conditioning blower, an opening degree of the temperature door, and outdoor temperature, using setting data such as a map or a table.

The setting data may be obtained via an advanced test and an evaluation process and may be setting information that is pre-input to the air conditioning controller and is stored and used by the air conditioning controller, and the air conditioning controller may determine the temperature difference value Td1 and the temperature variation value Td2 using the setting data such as the map or the table from the current blower intensity, the temperature door opening degree, and the outdoor temperature.

In one embodiment, for heating, the forced engine driving may be carried out when the temperature of the coolant is a predetermined temperature, for example, 45° C. In another embodiment, the predetermined temperature for starting forced engine driving is not predetermined to a specific temperature, and it may be necessary for the forced engine driving to be performed while the engine is in a stopped state for heating purposes.

In one embodiment, the predetermined temperature Tref may be 55° C. When the temperature of the coolant is 50° C., the difference between the coolant temperature (50° C.) and the Tref (55° C.) reaches a predetermined value Td1 (e.g., 5° C.), and pre-engine driving may be carried out at a coolant temperature of 50° C. As discussed above, however, the pre-engine driving is carried out under the condition that the engine efficiency and the hybrid system efficiency are greater than pre-set levels.

As such, according to the present disclosure, even if a forced engine driving condition is not satisfied during indoor heating, pre-engine driving may be determined to be required from information detected by a sensor and, simultaneously, when a condition in which pre-engine driving with high engine efficiency and system efficiency is possible is satisfied, an engine is pre-driven separately from forced engine driving to perform pre-engine driving of maintaining and managing coolant temperature to be equal to or greater than a predetermined level.

As a result, according to the present disclosure, the coolant temperature may be maintained and managed via the pre-engine driving. Thus, a frequency of forced engine driving and a forced driving time for heating when the vehicle is stationary or in slowdown or coasting may be reduced.

A time period in which an engine is stopped in a stationary state and a slowdown state (regenerative mode) for enhancing fuel efficiency of a hybrid electric vehicle may be increased, thereby enhancing fuel efficiency of the vehicle during the winter season.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments of the invention have been described in detail. However, it will be appreciated by those skilled in the art that changes may be made in these embodiments without departing from the principles and spirit of the invention, the scope of which is defined in the appended claims and their equivalents.

What is claimed is:

1. An engine control method for heating of a hybrid electric vehicle, the method comprising:
   collecting information for air conditioning control from at least one sensor during operation of a heating, ventilation, and air conditioning (HVAC) device in the hybrid electric vehicle in which forced engine driving and pre-engine driving can be performed for heating;
   determining, by a controller, whether a condition that requires the pre-engine driving for heating engine coolant is satisfied based on the collected information;
   upon determining that the condition that requires the pre-engine driving is satisfied, determining, by the controller, whether a condition for allowing the pre-engine driving is satisfied based on engine efficiency and hybrid system efficiency information; and
   upon determining that the condition for allowing the pre-engine driving is satisfied, performing, by the controller, the pre-engine driving for driving an engine to manage engine coolant temperature,
   wherein the determining of whether the condition that requires the pre-engine driving is satisfied comprises:
       comparing the engine coolant temperature obtained from the collected information with a predetermined pre-engine driving reference temperature; and
       determining that the pre-engine driving is required when a difference between the engine coolant temperature and the predetermined pre-engine driving reference temperature reaches a predetermined temperature difference value;
   wherein the predetermined temperature difference value is a variation value determined based on an operation state of an air conditioning blower, an opening degree of a temperature door, and outdoor temperature detected by an outdoor temperature sensor.

2. The method of claim 1, wherein the forced engine driving for heating is a mode for forcibly driving the engine when the engine coolant temperature is lower than a predetermined temperature required for heating.

3. The method of claim 1, wherein the forced engine driving for heating is a mode for forcibly driving the engine when a discharge-port air temperature of the HVAC device, which is detected by a sensor, is lower than a predetermined temperature required for heating.

4. An engine control method for heating of a hybrid electric vehicle, the method comprising:
- collecting information for air conditioning control from at least one sensor during operation of a heating, ventilation, and air conditioning (HVAC) device in the hybrid electric vehicle in which forced engine driving and pre-engine driving can be performed for heating;
- determining, by a controller, whether a condition that requires the pre-engine driving for heating engine coolant is satisfied based on the collected information;
- upon determining that the condition that requires the pre-engine driving is satisfied, determining, by the controller, whether a condition for allowing the pre-engine driving is satisfied based on engine efficiency and hybrid system efficiency information; and
- upon determining that the condition for allowing the pre-engine driving is satisfied, performing, by the controller, the pre-engine driving for driving an engine to manage engine coolant temperature,
- wherein the determining of whether the condition that requires the pre-engine driving is satisfied comprises:
- comparing discharge-port air temperature of the HVAC device obtained from the collected information with a predetermined pre-engine driving reference temperature; and
- determining that the pre-engine driving is required, when a difference between the discharge-port air temperature of the HVAC device and the predetermined pre-engine driving reference temperature reaches a predetermined temperature difference value,
- wherein the predetermined temperature difference value is a variation value determined based on an operation state of an air conditioning blower, an opening degree of a temperature door, and outdoor temperature detected by an outdoor temperature sensor.

5. The method of claim 1, wherein the determining of whether the condition for permitting the pre-engine driving is satisfied comprises determining that the condition for allowing the pre-engine driving is satisfied when the engine efficiency and the hybrid system efficiency are equal to or greater than predetermined levels, respectively.

6. The method of claim 1, further comprising stopping the pre-engine driving when the coolant temperature or a discharge-port air temperature of the HVAC device obtained from the collected information during the pre-engine driving is elevated to a predetermined temperature variation value from a time point when the pre-engine driving is started.

7. An engine control method for heating of a hybrid electric vehicle, the method comprising:
- collecting information for air conditioning control from at least one sensor during operation of a heating, ventilation, and air conditioning (HVAC) device in the hybrid electric vehicle in which forced engine driving and pre-engine driving can be performed for heating;
- determining, by a controller, whether a condition that requires the pre-engine driving for heating engine coolant is satisfied based on the collected information;
- upon determining that the condition that requires the pre-engine driving is satisfied, determining, by the controller, whether a condition for allowing the pre-engine driving is satisfied based on engine efficiency and hybrid system efficiency information;
- upon determining that the condition for allowing the pre-engine driving is satisfied, performing, by the controller, the pre-engine driving for driving an engine to manage engine coolant temperature; and
- stopping the pre-engine driving when the coolant temperature or a discharge-port air temperature of the HVAC device obtained from the collected information during the pre-engine driving is elevated to a predetermined temperature variation value from a time point when the pre-engine driving is started;
- wherein the predetermined temperature variation value is determined based on an operation state of an air conditioning blower, an opening degree of a temperature door, and outdoor temperature detected by an outdoor temperature sensor.

* * * * *